Jan. 26, 1960  J. E. DAVENPORT  2,922,761
SETTLING FINELY DIVIDED SOLIDS FROM GELLED SUSPENSIONS
Filed Aug. 20, 1954  2 Sheets-Sheet 1

John E. Davenport INVENTOR.
BY Bentley C. Morrow
Attorney

Jan. 26, 1960  J. E. DAVENPORT  2,922,761
SETTLING FINELY DIVIDED SOLIDS FROM GELLED SUSPENSIONS
Filed Aug. 20, 1954  2 Sheets-Sheet 2

John E. Davenport INVENTOR.
BY Bentley C. Morrow
Attorney

United States Patent Office 2,922,761
Patented Jan. 26, 1960

2,922,761

SETTLING FINELY DIVIDED SOLIDS FROM GELLED SUSPENSIONS

John E. Davenport, Muscle Shoals City, Ala., assignor to Tennessee Valley Authority, a corporation of the United States Application August 20, 1954, Serial No. 451,322

2 Claims. (Cl. 210—49)

(Granted under Title 35, U.S. Code (1952), sec. 266)

The invention herein described may be manufactured and used by or for the Government for governmental purposes without payment to me of any royalty thereon.

This invention relates to the settling of finely divided solids from gelled suspensions. It relates in particular to a method for increasing the settling rate of suspensions that normally settle at an extremely slow rate because of the formation of a gel-like structure.

One type of suspension to which my invention is applicable is the tailing suspension produced in the beneficiation of phosphate ore. Many deposits of low-grade Tennessee phosphate ore contain clay as the major impurity. The ore is a mixture of relatively coarse phosphate particles and relatively fine clay and quartz. In the customary method for beneficiating such ores the phosphate is separated from the clay by hydraulic classification. The clay fraction is discarded in the form of a tailing suspension containing about 5 percent by weight of solids. Approximately 5,000 gallons of tailing must be discarded for each ton of phosphate concentrate recovered. The clay in the suspension is extremely finely divided; most of the clay is less than 10 microns in diameter, and more than half is present as minus 0.5-micron material.

Disposal of the tailing suspension presents a difficult problem for phosphate producers. The muddy water cannot be discharged into streams because of the nuisance it would create. Of the various methods that have been tested or considered for disposal of the tailing, storage in settling ponds has been found to be the most economical. The low settling rate of the tailing solids, however, greatly limits the capacity of ponds and necessitates the construction of a number of large, expensive ponds.

When the tailing suspension is introduced into a pond it settles fairly rapidly until a concentration of 10 to 15 percent solids is reached. At such concentrations the suspension thickens to form a gel-like structure. Thereafter, further increase in solids concentration takes place very slowly. It has been found that after 5 years the settled suspension contains only about 30 percent solids. Only after 10 years or more does the suspension settle sufficiently that the material can be dug out of the pond and used to fill in mined-out areas.

Another type of suspension to which my invention is applicable is produced in the beneficiation of Florida "leached zone" material. The term "leached zone" is applied to material that is found overlying deposits of phosphate rock in Florida. The principal phosphatic constituents of the leached zone or wavellite and pseudo-wavellite, which are aluminum-phosphate containing minerals.

In one method for beneficiating leached-zone material, a substantial proportion of the aluminum phosphate is concentrated in a dilute aqueous suspension of finely divided solids. In order to process the suspension for recovery of valuable minerals contained therein it is necessary, for economic reasons, to remove much of the water. The solids content of the suspension can be increased appreciably by allowing it to settle, but the rate of settling is very low.

Insofar as I know, the process of my invention has general application in settling suspensions of solids that tend to settle very slowly because of the formation of gels. In addition to the suspensions just described, my invention is effective in increasing the settling rate of suspensions of finely divided calcium carbonate, magnesium hydroxide, and mixed ferric hydroxide and calcium sulfate.

The sedimentation of suspensions of the type described proceeds in several distinct stages. These are (1) free settling of the solids in dilute suspensions, (2) hindered settling of the solids as the slurry becomes more concentrated, (3) a transition stage, and (4) compression settling as water is squeezed from the gel which is formed in the transition stage. The rate of settling in the fourth stage is extremely slow as compared to the settling rates in the preceding stages.

It is an object of this invention to provide a process for settling finely divided solids from a gelled suspension at greatly increased rate.

Another object is to provide such process which greatly increases the capacity of ponds used for settling phosphate tailings or leached-zone slimes.

Another object is to provide such process wherein dilute suspension may be introduced and thickened solution withdrawn continuously.

Still another object is to provide such process that can be carried out simply and at low cost.

Other objects and advantages of my invention will become apparent from the following description.

I have found that these objects may be attained by forming a gelled suspension of the type described in a settling chamber preferably having rectilinear sides. Substantially the entire body of gelled suspension is then subjected to slow intermittent shear. The shearing elements should pass through the suspension at a rate from 20 to about 200 feet per hour, depending on the type of solids contained in the gelled suspension. Gelled phosphate tailings, for example, settle most rapidly when the shearing elements travel at about 100 feet per hour.

In the accompanying drawings, Figure 1 is a plan view illustrating one means whereby my invention may be applied to the treatment of a suspension in a large pond.

Figure 4:
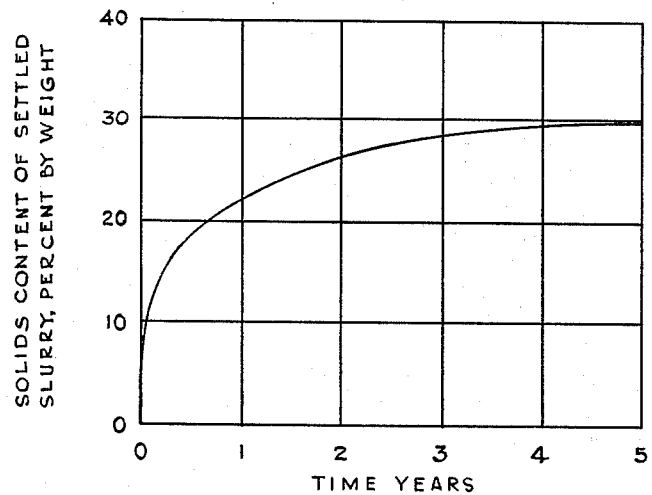
Figure 4 is a graph which shows the normal long-term settling characteristics of a typical sample of tailing suspension obtained in the beneficiation of Tennessee phosphate ore.
Figure 5:
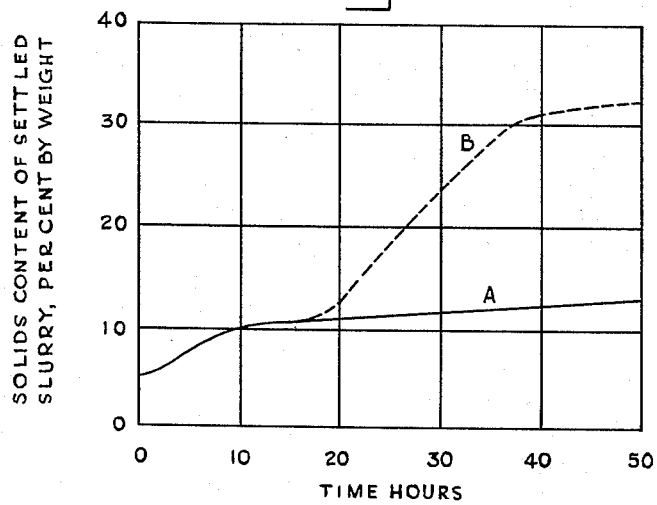
Figure 5 is a graph which shows the improvement in settling rate of solids in a tailing suspension obtainable through application of my process.

The manner in which the curves shown in Figure 4 and Figure 5 were obtained is fully described in a subsequent section of this specification. At this point, however, it is appropriate to refer to these figures to note that through application of my novel process, illustrated by curve B of Figure 5, it is possible to attain in a matter of hours a degree of thickening that is attained only over a period of about 5 years of normal settling, as shown by the curve in Figure 4.

Figure 1:
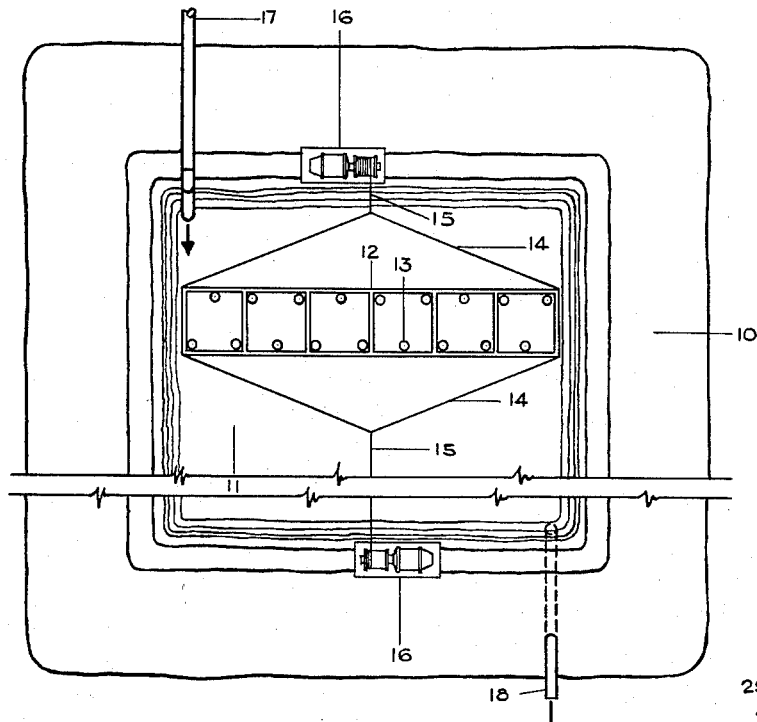

Referring now to Figure 1, the numeral 10 designates a dike enclosing pond 11 having rectilinear sides. A float 12, constructed of timbers, floats on the surface of pond 11. Fastened to float 12 are vertically disposed shearing elements 13. The shearing elements 13 extend below the bottom of the float timbers and may be made conveniently from pipe about 4 to 6 inches in diameter. Bridles 14 are fastened to either side of float 12, and towing cables 15 are fastened to each bridle. Winches 16, located at opposite ends of pond 11, are adapted to tow the float slowly back and forth across the pond. The float is towed across the pond at a speed of 20 to 200 feet per hour, or preferably at about 100 feet per hour when the material settled is phosphate tailing.

Tailing suspension is introduced in the pond via line 17. Clear water is decanted from the pond by means of overflow 18, which can be raised or lowered so that its upper edge is located just beneath the surface of the pond.

In the operation of the system shown in Figure 1, tailing suspension is introduced into pond 11. When the suspension is of sufficient depth to provide buoyancy to float 12, the float is set in motion. The shearing action caused by moving the float back and forth across the pond causes the solids to thicken to a slurry containing about 30 percent solids. As the pond fills, the suspended solids introduced are progressively settled. After the pond is full, the float and winches may be moved to another pond. The 30 percent suspension is left in the first pond until it is dewatered by the combined effects of filtration, evaporation, and transpiration to such a consistency that it may be dug out of the pond and used to fill in mined-out areas. The pond is then ready for reuse.

By the procedure described, the capacity of a given settling pond is about double the capacity it would have if the suspension were allowed to settle in the normal manner.

Figure 2:
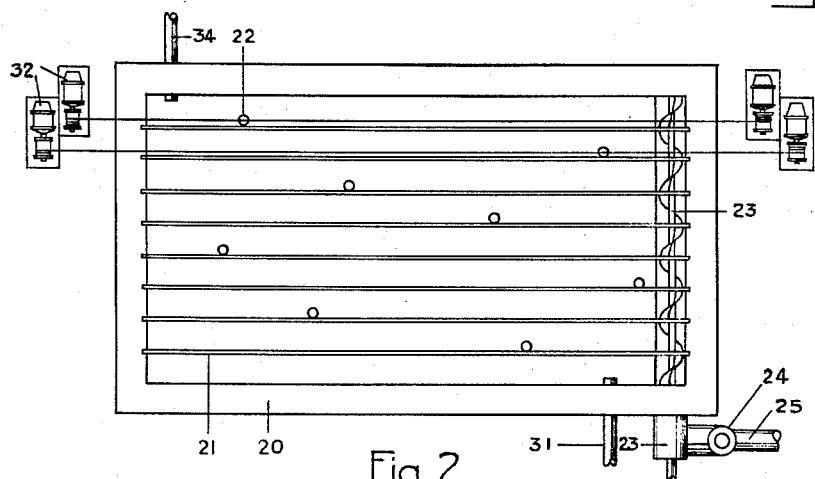
Figure 2 is a plan view showing an application of the process of my invention wherein introduction of dilute suspension and withdrawal of thickened suspension are carried out continuously.

Figure 2 illustrates another application of my invention. Numeral 20 designates a rectangular tank, preferably constructed of concrete. Disposed longitudinally above the tank are rails 21. Suspended from each rail is a reciprocating shearing element 22 which extends to within about 2 inches of the bottom of the tank. The shearing elements 22 are preferably constructed of pipe from 4 to 6 inches in diameter. The distance between adjacent rails is about twice the diameter of the pipe.

Means, marked 32, are provided to propel the shearing elements back and forth along the rails for substantially the full length of the tank at a linear speed of 20 to 200 feet per hour. Any suitable means may be provided for this purpose. Adjacent shearing elements are caused to move in opposite directions.

Pipe 34 is provided at one end of tank 20 for introduction of tailing suspenson. This pipe is located near the surface of the suspension. Means for removing thickened suspension are provided at the end of the tank opposite from the inlet pipe. As shown, such means comprise horizontal screw conveyor 23, which is located in a depression in the tank bottom; and vertical screw conveyor 24, into which conveyor 23 discharges, and which elevates the thickened suspension to outlet 25. Outlet 25 is located at about the level of the surface of the suspension in tank 20 so that there will be no static pressure tending to force material out of screw conveyor 24 or to retard the flow of material therefrom. Clear water leaves the tank via overflow 31.

Figure 3:
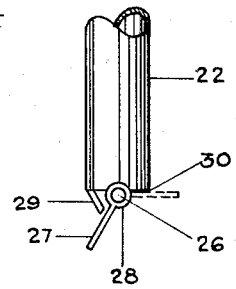
Figure 3 is an elevation view showing details of the lower end of the shearing elements used in the apparatus shown in Figure 2.

Details of the lower portion of a shearing element 22 are shown in Figure 3. The shearing element 22 consists of a length of pipe. To the bottom of the pipe is welded shaft 26. Plate 27 is suspended from shaft 26 by means of eyes 28 and is adapted to swing freely about the axis of the shaft. The swing of plate 27 is limited in one direction by lug 29, and in the other direction by lug 30. Shearing element 22 is positioned so that when it is moving toward the discharge end of tank 20 plate 27 assumes the position shown in solid lines, and when the shearing element is moving away from the discharge the plate assumes the position shown in dotted outline. Plate 27 is nearly as long as the distance between adjacent shearing elements. The plate thus tends to sweep thickened suspension to the discharge end of the tank.

In starting operation of the system shown in Figure 2, the tailing suspension is introduced into tank 20 via line 34. When the suspension in the tank has reached a depth of about 1 foot, shearing elements 22 are set in motion. Discharge conveyors 23 and 24 are started when the level of the suspension reaches the overflow 31. Thereafter, thickened tailing containing about 25 to 40 percent solids is removed continuously from the tank and is transferred to storage ponds for further removal of water.

My studies on the sedimentation of gelatinous suspensions show that the settling rate of such suspensions is greatly increased by slow continuous or intermittent shearing. Results of these tests and visual observation of the suspensions during the tests support the conclusion that the effect of shearing is more complex than the mere maintenance of channels for escape of water from the suspension. When a gelled suspension is first sheared, cracks radiate outward from the front of the shearing element like spokes in a wheel. As the element continues to move the cracks widen, cross fractures appear, and chunks of gel break off and fall into the fissures. After shearing for about 15 to 30 minutes, the cracks disappear but the surface of the suspesion is faintly particulate in appearance and a complex pattern of flow lines is visible. When shearing is continued for an hour or two the surface of the suspension is completely featureless, presumably because of the presence of a layer of finely divided solids that are carried to the surface by rising water currents. When settling has nearly ceased, usually after shearing for about 20 hours, the suspension has a pebbled appearance and the surface of the slurry is covered with spherical structures 1 to 2 millimeters in diameter.

These observations suggest that the beneficial effect of gentle shearing on the settling of gelled suspensions results from breaking the gel into fragments that are too large to be reunited by the attractive forces on their surfaces and from the gradual increase in density of these particles that results from the rolling, kneading action produced by shearing the gel. Destruction of the continuity of the gel structure allows the water squeezed from the particles to rise to the surface without obstruction.

The optimum conditions appear to be those that keep the entire body of suspension in a state of slow, continuous shear. Provision of these conditions in a large volume of suspension, however, would require a very large number of shearing elements and a complicated shearing mechanism. Since it is impracticale to keep all the suspension in continual shear, it is necessary to strike a compromise between the frequency with which a given portion of the suspension is sheared and the rate of shear.

Such a compromise is effected by methods such as those described hereinbefore in connection with Figures 1 and 2.

The method of Figure 1 is most suitable for use in large ponds. Because the speed of the float is low, preferably about 100 feet per hour when phosphate tailings are settled, the float will pass a given point in the suspension only infrequently. The time required to settle the suspension to a given solids content is, therefore, greater than it would be if the suspension were sheared more frequently. Nonetheless, I have found that if the frequency of shear is at least once in 24 hours the rate of settling is much greater than the normal settling rate. For example, a phosphate tailing sample that was sheared once every 12 hours settled to 28 percent solids in 28 days. Tests have shown that an unsheared suspension requires nearly 5 years to reach the same solids content.

In the method of Figure 2 the frequency of shear is much greater than in that of Figure 1, and the settling rate is correspondingly greater. The effectiveness of shear also is increased by the fact that the adjacent elements move in opposite directions. Unless this is done, the gelled suspension will tend to move as a mass, thus decreasing the shear. It is this feature of the gelled suspension that makes it impractical to use a circular tank with revolving shearing elements unless these move in opposite directions. Moreover, in a circular tank the shearing elements at the outer edge would be moving too rapidly, and those near the center too slowly unless a very complicated drive mechanism is used.

The speed of the shearing elements is quite critical. I have found that speeds within the range of 20 to 200 feet per hour are effective. There is an optimum speed within this range for each type of suspension. For phosphate tailing, for example, the optimum speed is about 100 feet per hour.

In batch tests of my process it was noted that there was no benefit in shearing a suspension until it had reached the gelled stage. Such shearing, in fact, retarded the settling rate of the solids. This phenomenon does not adversely affect the practical operation of my process, however. In starting operation of either of the methods of Figures 1 and 2, it is merely necessary to start the shearing mechanism after the material in the pond or tank has reached the gelled compression-settling stage. Thereafter the proportion of fresh suspension added to total suspension is so small that retarded settling does not take place.

Example I

The settling characteristics of tailing suspension resulting from the washing of Tennessee phosphate ore were determined in tests covering a period of 5 years. The ore from which the tailing was obtained had been treated with 2 to 3 pounds of sodium hydroxide per ton of dry ore; sodium hydroxide tends to disperse the clay particles in the ore and is used to obtain maximum recovery of phosphate. A typical size analysis of the tailing solids is given below:

| Size fraction, microns | Solids, percent of total |
|---|---|
| +10 | 16.9 |
| −10+5 | 6.7 |
| −5+2 | 9.1 |
| −2+0.5 | 14.7 |
| −0.5 | 52.6 |

It had been found that the dispersant effect of sodium hydroxide could be counteracted by the addition of calcium sulfate to the tailing suspension. Calcium sulfate was added to samples of 5 percent tailing suspension and the samples were introduced into vertical glass cylinders 2.5 centimeters in diameter and 100 centimeters deep. As solids settled, the line of demarcation between the settled solids and the supernatant water was sharp. The height of the settled layer was measured at suitable intervals, and the solids content of the settled portion was estimated from the volume of the settled slurry.

At first, settling was fairly rapid. Within about 10 to 20 hours, however, a gel structure had formed, and thereafter the settling rate was extremely slow.

The maximum solids content of the settled portion of the samples after 5 years was 29.5 percent. The settling curve of this sample is shown in Figure 4.

Example II

Tests of my process were carried out on Tennessee phosphate tailing in a rectangular tank 2 feet wide, 4 feet long, and 2 feet deep. The tailing suspension was sheared by elements that were suspended from two chains, each of which described an endless horizontal path about two sprockets that were mounted above the tank near opposite ends thereof. The two chains provided four shearing tracks about 6 inches apart, and the shearing elements in adjacent tracks moved in opposite directions. The shearing elements were made of lengths of 3-inch pipe that were closed at the bottom. The bottoms of the pipes were 2 inches above the bottom of the tank.

In one test a 5 percent suspension treated with an optimum quantity of flocculant was introduced into the rectangular tank and allowed to settle without shearing. The settling rate of the suspension is shown in curve A of Figure 5. In a second test the contents of the tank were agitated vigorously to resuspend the solids, and the suspension was allowed to settle without shearing for 15 hours. Within the 15-hour period the characteristic gel structure had formed. The suspension was then thickened with shearing elements in motion. The results of this test are shown in curve B of Figure 5. The linear velocity of the shearing elements in the tests in which the suspension was sheared was 100 feet per hour.

Example III

Tests on Tennessee phosphate tailing wherein dilute suspension was introduced continuously and thickened suspension was removed continuously were carried out in a rectangular tank 2 feet wide, 4 feet long, and 4.5 feet deep. The suspension was sheared by three vertical 4-inch pipes that traveled on overhead rails back and forth along the length of the tank. The pipes were spaced on 8-inch centers across the width of the tank and were held rigidly vertical. The pipes were driven by an electric motor through sprockets and chain drives in such a manner that adjacent pipes were moved in opposite directions.

Dilute suspension treated with an optimum quantity of flocculant was introduced at one end of the tank at a point slightly above the level of liquid in the tank. Thickened solids were moved to the discharge end of the tank by means of hinged plates that were attached to the bottoms of the shearing pipes. A horizontal screw transferred the thickened material to a vertical screw, which elevated the material to a discharge outlet located near the top of the tank. The rates of shearing and of withdrawal of the thickened material were varied independently. Results of the tests are given in the following table:

| Period | Time, days | Shearing rate, ft./hr. | Underflow rate, gal./hr. | Solids content of underflow, weight percent | Rate, lb. of dry solids/hr. |
|---|---|---|---|---|---|
| 1 | 5.0 | 50 | 2.0 | 24.8 | 4.8 |
| 2 | 4.0 | 50 | 2.1 | 24.9 | 5.3 |
| 3 | 4.0 | 100 | 2.1 | 25.0 | 5.3 |
| 4 | 2.0 | 100 | 1.2 | 25.5 | 3.0 |
| 5 | 0.3 | 100 | 0.6 | 25.6 | 1.5 |
| 6 | 3.7 | 24 | 0.6 | 27.5 | 1.9 |
| 7 | 3.0 | 24 | 2.1 | 25.8 | 5.5 |
| 8 | 1.2 | 24 | 3.1 | 23.6 | 7.4 |

Example IV

Tests on an aluminum-phosphate bearing suspension produced in the beneficiation of Florida leached-zone material were carried out in the apparatus described in Example III.

Tests on the normal settling rate of the suspension gave the following results:

| Time, hours | Solids content of settled slurry, percent by weight |
|---|---|
| 0 | 12.9 |
| 1 | 13.7 |
| 2 | 15.0 |
| 3 | 16.8 |
| 4 | 19.6 |
| 5 | 21.4 |
| 6 | 21.8 |
| 24 | 24.6 |
| 48 | 26.0 |
| 72 | 26.6 |
| 96 | 27.0 |

In tests carried out in the manner described in Example III the following data were obtained with a feed suspension containing about 17 percent solids by weight:

| Rate of shearing, ft./min. | Underflow rate, pounds dry solids/hr. | Solids content of underflow, percent |
|---|---|---|
| 24 | 9.6 | 37 |
| 24 | 19.2 | 32 |
| 160 | 18.4 | 36 |
| 160 | 29.6 | 34 |

Filtration tests of the aluminum-phosphate suspension were carried out in a continuous vacuum filter. The filter had a drum 1 foot in diameter by 1 foot wide. The drum was covered with lightweight twill. The effective filter area was 3 square feet, and the vacuum was 27 inches of mercury.

The tests were made on suspensions that had been thickened to different degrees. One feed material consisted of suspension that had been thickened to 20 percent solids by free settling; the second, a suspension brought to 32 percent solids in the mechanical thickener; and the third, a suspension that had been mechanically thickened to 37 percent solids. The results of the tests are shown in the following table:

| Solids content of feed, wt. percent | Drum speed, rev./hr. | Solids content of filter cake, wt. percent | Filtering rate, lb. dry solids/sq. ft./hr. |
|---|---|---|---|
| 20.0 | 3.3 | 64.2 | 1.1 |
|  | 6.5 | 63.0 | 1.7 |
|  | 12.8 | 64.5 | 2.4 |
|  | 17.5 | 63.0 | 2.5 |
|  | 21.0 | 62.0 | 2.4 |
| 32.0 | 12.8 | 62.5 | 5.3 |
| 37.0 | 3.7 | 64.8 | 3.3 |
|  | 5.5 | 63.5 | 4.3 |
|  | 10.0 | 64.0 | 6.1 |
|  | 12.8 | 62.2 | 7.3 |
|  | 21.0 | 54.0 | 8.8 |

It will be seen that in its application to the aluminum-phosphate bearing suspension the process of my invention is advantageous in two main respects. In the first instance it is possible to obtain a thicker suspension than can be obtained in a reasonable time by ordinary sedimentation. Secondly, the thicker suspension obtained through my process can be filtered at a substantially higher rate than is possible with more dilute suspensions.

*Example V*

Additional tests were carried out to determine the applicability of my invention to other types of suspensions that normally settle very slowly.

The precipitates tested were formed under conditions that would yield gelatinous solids. Calcium carbonate was made by rapid mixing of warm solutions of calcium chloride and sodium hydroxide, and magnesium hydroxide was prepared similarly from magnesium chloride and sodium hydroxide. A mixture of ferric hydroxide and calcium sulfate, which simulated the material obtained when waste steel-mill pickle liquor is neutralized with lime, was prepared by adding calcium hydroxide to a sulfuric acid solution of ferric sulfate. Each precipitate was washed by decantation with water to minimize the effect of electrolytes on the settling rates. The freshly precipitated and washed solids were suspended in water and allowed to settle undisturbed and with slow shearing.

Samples of each suspension were placed in two vertical 2.5-centimeter glass tubes filled to a depth of 100 centimeters with the suspension. One of each of the samples was allowed to stand undisturbed; the other was sheared slowly. The shearing mechanism used was a metal strip, 1.25 centimeters wide and 0.3 centimeter thick, that was mounted axially in the tube and extended nearly to the bottom of the tube. The tube was rotated at the rate of 9 revolutions per hour. The results of the tests are shown in the following table. Results of a test with a phosphate tailing suspension are included for comparison.

| Settling time, hours | Solids content of settled slurry, percent by weight | | | | | | | |
|---|---|---|---|---|---|---|---|---|
|  | Ferric hydroxide plus calcium sulfate | | Calcium carbonate | | Magnesium hydroxide | | Tennessee phosphate tailing | |
|  | Not sheared | Sheared | Not sheared | Sheared | Not sheared | Sheared | Not sheared | Sheared |
| 0 | 4.0 | 4.0 | 9.0 | 9.0 | 7.2 | 7.2 | 3.0 | 3.0 |
| 4 | 6.2 | 5.3 | 17.0 | 12.5 | 7.6 | 7.9 | 4.6 | 4.2 |
| 8 | 7.2 | 9.2 |  |  | 7.9 | 9.0 | 5.5 | 5.5 |
| 16 | 8.4 | 14.4 |  |  | 8.0 | 10.8 | 6.0 | 9.5 |
| 24 | 9.4 | 16.4 | 21.5 | 41.5 |  | 11.5 | 6.4 | 13.2 |
| 32 |  |  |  |  |  |  | 6.6 | 17.4 |
| 40 | 9.8 | 18.8 |  |  | 8.4 | 13.8 | 6.8 | 19.2 |
| 44 |  |  | 23.0 | 46.5 |  |  | 6.9 | 20.5 |
| 48 | 10.2 | 19.9 |  |  |  |  |  |  |

Although shearing by the method employed in these tests is less effective than that obtained in the larger apparatus described hereinbefore, the tests show clearly that slow shearing is effective in accelerating the settling of gelatinous solids other than phosphate tailing.

I claim as my invention:

1. A process for settling finely divided solids from a gelled suspension of phosphate tailings containing about 10 to 15 percent solids which comprises subjecting substantially the entire body of gelled suspension to intermittent shear in substantially rectilinear direction at a rate of about 100 feet per hour.

2. A process for settling finely divided solids from a gelled suspension of phosphate tailings containing about 10 to 15 percent solids which comprises continuously passing a series of reciprocating shearing elements through substantially the entire body of gelled suspension in substantially rectilinear direction at a rate of about 100 feet per hour; maintaining a frequency of shear of at least once in 12 hours substantially throughout the suspension, whereby the time required for settling to produce a suspension containing about 30 percent solids is reduced by about 5 years.

References Cited in the file of this patent

UNITED STATES PATENTS

| | | |
|---|---|---|
| 1,605,596 | Langlier | Nov. 2, 1926 |
| 1,893,451 | Smith | Jan. 3, 1933 |
| 1,938,894 | Darby et al. | Dec. 12, 1933 |
| 2,021,672 | Spaulding | Nov. 19, 1935 |
| 2,128,393 | Allen | Aug. 30, 1938 |

UNITED STATES PATENT OFFICE

CERTIFICATE OF CORRECTION

Patent No. 2,922,761                                January 26, 1960

John E. Davenport

It is hereby certified that error appears in the above numbered patent requiring correction and that the said Letters Patent should read as corrected below.

Column 1, line 63, for "or" read -- are --; column 4, line 27, for "suspesion" read -- suspension --; line 53, for "impracticale" read -- impracticable --; column 8, line 2, for "sodium hydroxide" read -- sodium carbonate --.

Signed and sealed this 12th day of July 1960.

(SEAL)
Attest:

KARL H. AXLINE                                       ROBERT C. WATSON
Attesting Officer                                    Commissioner of Patents